United States Patent [19]

Ikematsu et al.

[11] Patent Number: 4,750,550
[45] Date of Patent: Jun. 14, 1988

[54] METHOD FOR THE TRANSFER OF HEAT ENERGY

[75] Inventors: Masaki Ikematsu; Eiichi Yoshida; Kazuo Sakai, all of Yokohama, Japan

[73] Assignee: Nippon Oil Co. Ltd., Japan

[21] Appl. No.: 882,885

[22] PCT Filed: Oct. 31, 1985

[86] PCT No.: PCT/JP85/00606
§ 371 Date: Jun. 24, 1986
§ 102(e) Date: Jun. 24, 1986

[87] PCT Pub. No.: WO86/02715
PCT Pub. Date: May 9, 1986

[30] Foreign Application Priority Data

Oct. 31, 1984 [JP] Japan .................. 59-227898

[51] Int. Cl.$^4$ ............................................. F28D 21/00
[52] U.S. Cl. ................................ 165/104.12; 62/497
[58] Field of Search ..................... 165/104.12; 62/497

[56] References Cited

U.S. PATENT DOCUMENTS 2,802,344  8/1957  Witherell ........................... 62/497

FOREIGN PATENT DOCUMENTS 2955    2/1965   Japan ....................... 165/104.12
62550   5/1979   Japan .
223395 10/1924   United Kingdom .......... 62/497

Primary Examiner—Albert W. Davis, Jr.
Attorney, Agent, or Firm—McGlew and Tuttle

[57] ABSTRACT

The present invention provides a novel method for the transfer of heat energy which comprises producing the vapor of a heat-transfer medium at a heat generation place 1, transporting the resulting heat-transfer medium vapor to an absorption tank 4, allowing it to be absorbed into an absorption fluid containing an absorbent and thereby raising the temperature of the resulting liquid mixture of the heat-transfer medium and the absorption fluid to a temperature higher than that of the heat-transfer medium vapor, utilizing the heat of the liquid medium thus obtained, separating it into a heat-transfer medium and an absorption fluid by means of a semipermeable membranous material, and recycling and reusing them as the heat-transfer medium and the absorption fluid, respectively. This method for the transfer of heat energy permits energy of high quality to be transferred with high thermal efficiency and, in particular, permits low-pressure steam to be transported efficiently and stored with little loss of heat.

8 Claims, 3 Drawing Sheets

METHOD FOR THE TRANSFER OF HEAT ENERGY

DESCRIPTION

TECHNICAL FIELD

This invention relates to a novel method for the efficient transfer of heat energy.

BACKGROUND ART

In district cooling or heating and central cooling or heating, the most important technique is to transfer heat energy from a heat generation place to widely scattered places of heat consumption. In the prior art, this transfer of heat energy has been carried out by using high-temperature water or steam as the medium. In either case, however, the dissipation loss of heat during its transport is substantial and, in an extreme case, as much as 50% of the effective heat energy is lost during its transport. This involves a serious problem in that the energy-saving nature of central cooling or heating is markedly impaired.

Moreover, since the heat-transfer medium such as high-temperature water or steam transported according to the prior art methods is directly utilized on the consumer side, heat storage functioning to maintain an adequate balance between heat generation and heat utilization cannot be achieved efficiently. Furthermore, especially where high-temperature water or low-pressure steam is used as the heat-transfer medium, a decrease in temperature of the heat-transfer medium provided for heat utilization as compared with its temperature at the heat generation place, i.e., the so-called degradation in the quality of energy, has been unavoidable.

DISCLOSURE OF THE INVENTION

It is an object of the present invention to provide a novel method for the transfer of heat energy which makes improvements over the above-described prior art methods for the transfer of heat energy and gives energy of high quality on the consumer side.

It is another object of the present invention to provide a method for the transfer of heat energy which, in particular, permits low-pressure steam to be transported efficiently and stored with little loss of heat.

It is still another object of the present invention to provide operating conditions under which this method for the transfer of heat energy can be carried out with very high thermal efficiency.

According to the present invention, there is provided a method for the transfer of heat energy which comprises the steps of (A) heating a liquid heat-transfer medium at a heat generation place to produce the vapor of said heat-transfer medium;

(B) transporting the resulting heat-transfer medium vapor through a transport pipeline;

(C) introducing the transported heat-transfer medium vapor into an absorption tank and allowing said heat-transfer medium vapor to be absorbed into an absorption fluid containing an absorbent, whereby the latent heat of said heat-transfer medium vapor and the heat of mixing generated by mixing of said heat-transfer medium and said absorption fluid are utilized to elevate the temperature of the resulting liquid mixture of said heat-transfer medium and said absorption fluid to a temperature higher than that of said heat-transfer medium vapor;

(D) withdrawing said mixture having the elevated temperature and utilizing its heat with the aid of a heat exchanger; and (E) separating said mixture having a lowered temperature as a result of the heat utilization into a liquid heat-transfer medium and an absorption fluid by means of a semipermeable membranous material having porosity, and recycling and reusing them as said heat-transfer medium and said absorption fluid, respectively.

BEST MODE FOR CARRYING OUT THE INVENTION

Figure 1:
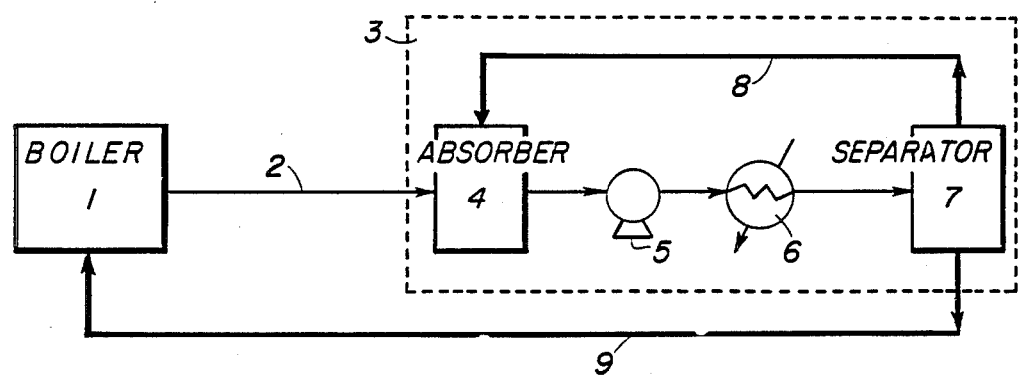
FIG. 1 is a flow sheet illustrating one embodiment of the method for the transfer of heat energy in accordance with the present invention.

The heat-transfer medium used in the present method for the transfer of heat energy can be any substance that has all of the following characteristics:

1. It has a high latent heat of vaporization.
2. It is excellent in thermal stability.
3. It has low toxicity and flammability, and is easy to handle.
4. It is inexpensive.

However, water, alcohol and an aqueous solution of alcohol may preferably be used. Among them, water is most preferred.

The heat generated at the heat generation place can be any type of heat, provided that it has a sufficiently high temperature to vaporize the aforesaid heat-transfer medium and thereby produce its vapor. For example, heat generated by the combustion of petroleum, gas and other fuels, and waste heat resulting from various production processes can be used.

Where water is used as the heat-transfer medium in the method of the present invention, low-pressure steam having a vapor pressure of 100 mmHg to 10 kgG/cm$^2$, preferably 100 mmHg to 5 kgG/cm$^2$, can be effectively utilized as the heat-transfer medium vapor produced by the heating of water. If the pipe diameter and the vapor temperature are constant, the amount of heat dissipated from an uncovered pipe increases with an increase in vapor pressure. Accordingly, low-pressure steam is more preferable for use as the heat-transfer medium than high-pressure steam, because the former allows a smaller quantity of heat to be dissipated from the transport pipeline. It is one of the great advantages of the present invention to permit effective utilization of low-pressure steam which is liable to degradation in the quality of energy.

In order to heat a liquid heat-transfer medium with the heat generated at the heat generation place and to produce the vapor of the heat-transfer medium, various types of conventional equipment heretofore in use for the heating of heat-transfer media, such as boilers and heat exchangers, may be used as is.

As the transport pipeline used in step (B) and the absorption tank used in step (D) of the present method, there may be employed any pipeline and absorption tank having a thermally insulated structure.

As the absorption fluid used in the method of the present invention, there may be employed any fluid that can absorb the heat-transfer medium efficiently and evolve heat as a result of its mixing with the aforesaid heat-transfer medium. However, an aqueous solution of one or more compounds selected from the group consisting of lithium chloride, lithium bromide, lithium nitrate, magnesium chloride, magnesium bromide, calcium chloride, calcium bromide, zinc chloride, sodium hydroxide and ammonia (these compounds will hereinafter be generally referred to as absorbents) is preferred because it is excellent in absorptivity for the heat-transfer medium, in heat-generating capacity by mixing with the heat-transfer medium, and in handling stability. Among others, an aqueous solution of one or more compounds selected from the group consisting of lithium chloride, lithium bromide, magnesium chloride and calcium chloride is especially preferred.

Moreover, in the method of the present invention, a polyhydric alcohol may optionally be added to the absorption fluid. If a polyhydric alcohol is added, the ability of the absorption fluid to absorb the heat-transfer medium vapor is improved without reducing the separation efficiency of the absorption fluid in the separation section, thus making it possible to enhance the heat-transfer efficiency. However, the addition of too much polyhydric alcohol may be undesirable because the separation efficiency of the polyhydric alcohol itself in the separation section is reduced. Polyhydric alcohols useful for this purpose include, for example, ethylene glycol, propylene glycol, glycerol, trimethylol propane, pentaerythritol, sorbitol, diethylene glycol, triethylene glycol, tetraethylene glycol, dipropylene glycol, tripropylene glycol and mixtures thereof.

By utilizing the heat of mixing generated by mixing of the heat-transfer medium vapor transported through the transport pipeline and the absorption fluid, as well as the latent heat of vaporization of the heat-transfer medium vapor, the temperature of the mixture of the heat-transfer medium and the absorption fluid must be elevated to a temperature higher than that of the heat-transfer medium vapor. Accordingly, the absorption fluid for absorbing the heat-transfer medium vapor is preferably preheated to a temperature approaching that of the heat-transfer medium vapor before being absorbed. To this end, part of the heat-transfer medium vapor may be used exclusively for heating the absorption fluid, instead of being absorbed into the absorption fluid.

Thus, by mixing the heat-transfer medium vapor and the absorption fluid in the absorption tank a liquid mixture having a temperature higher than that of the heat-transfer medium transported to the mixing section by way of the transport pipeline, i.e., having a high quality of energy, can be obtained without using any special high-temperature source, and the mixture having this elevated temperature can be used for the desired purpose of heat utilization with the aid of a heat exchanger. Where low-pressure steam is used as the heat-transfer medium, heat storage on the heat demand side has been practically impossible for reasons of heat dissipation and space requirements of the heat-transfer medium. However, since the boiling point of the aforesaid mixture is markedly elevated from that of the heat-transfer medium itself because of the ebullioscopic effect exerted by mixing of its components, the mixture can be stirred in liquid form within the absorption tank and, according to need, withdrawn from the absorption tank and used for the desired prupose of heat utilization with the aid of a heat exchanger. For example, if low-pressure steam having a temperature of about 100° C. is used as the heat-transfer medium vapor produced at the heat generation place and an aqueous solution of lithium bromide is used as the absorption fluid, the system can be operated in such a way that the temperature of the mixture within the absorption tank is in the range of about 101° to 150° C. Also in the method of the present invention, the thermal efficiency can be further improved, as desired, by providing a heat storage tank next to the absorption tank.

The mixture having a lowered temperature as a result of the heat utilization is conducted into a separation section incorporating a semipermeable membranous material having porosity, where it is separated into a heat-transfer medium and an absorption fluid. As the semipermeable membranous material having porosity which is incorporated in the separation section, there may be employed any material that can separate the mixture efficiently into a liquid heat-transfer medium and an absorption fluid. However, it is preferable from the viewpoint of separating power to use an organic semipermeable material consisting essentially of cellulose acetate, methyl cellulose, polyether, polysulfone or polystyrene, or an inorganic semipermeable material consisting of a metallic colloid of zirconium, iron or copper supported on a porous ceramic member.

The heat-transfer medium and the absorption fluid separated in the separation section are recycled and reused as the liquid heat-transfer medium at the heat generation place and the absorption fluid for absorbing the heat-transfer medium vapor, respectively.

If the amount of heat-transfer medium vapor produced per unit time in step (A) is designated as $W_1$ parts by weight and the amount of absorption fluid recycled per unit time in step (E) (the amount of absorption fluid separated in the separation section and returned to the absorption tank) is designated as $W_2$ parts by weight, the method of the present invention should preferably be carried out in such a way that $W_1$ and $W_2$ satisfy the relationship represented by $$8 \leq W_2/W_1 \leq 200.$$

If the value of $W_2/W_1$ is less than 8 or greater than 200, the loss of energy during heat transfer will be increased and the capability of separating the heat-transfer medium from the absorption fluid in step (E) will be degraded.

Moreover, in the method of the present invention, the absorption fluid should preferably be made up in such a way that the weight fractions of its components satisfy the relationship represented by $$0 \leq z < x \leq 0.3 - z \text{ (provided that } x+y+z=1)$$

where x, y and z stand for the weight fractions of the absorbent, water and polyhydric alcohol, respectively.

If x, y and z do not satisfy the above-described relationship, the loss of energy during heat transfer will be increased and the capability of separating the heat-transfer medium from the absorption fluid in step (E) by means of a semipermeable membranous material will be degraded.

Furthermore, the weight fraction x of the absorbent in the absorption fluid should preferably be not less than 0.04. If the weight fraction of the absorbent is unduly low, sufficient heat of mixing will not be generated and the temperature of the mixture cannot be made sufficiently higher than the temperature of the transported heat-transfer medium.

Where no polyhydric alcohol is added to the absorption fluid, the weight fraction x of the absorbent should preferably not be greater than 0.25. At higher concentrations, both the separation efficiency through a semipermeable membranous material and the energy efficiency of heat transfer will be reduced.

The method for the transfer of heat energy in accordance with the present invention has the following advantages over the prior art methods:

1. Since low-pressure steam having a latent heat of vaporization of as high as about 540 kcal/kg can be efficiently utilized as the heat-transfer medium vapor, not only the quantity of heat transferred per unit weight of the heat-transfer medium can be increased as compared with the use of high-temperature water, but also the dissipation loss of heat from the transport pipeline for heat-transfer medium is decreased as compared with the use of high-pressure steam. In addition, the construction and maintenance cost of the system can also be cut down.

2. The use of an absorption fluid having a strong affinity for the heat-transfer medium produces a driving force which causes the heat-transfer medium to be transferred from the heating source to the heat utilization place. This makes it unnecessary to use other driving sources such as heat-transfer medium pressurizing pumps and the like.

3. By utilizing the heat of mixing generated by mixing of the heat-transfer medium and the absorption fluid, the temperature of the heat-transfer medium/absorption fluid mixture can be elevated to a temperature higher than that of the heat-transfer medium vapor. In this case, the boiling point of the heat-transfer medium/absorption fluid mixture is markedly elevated from that of the heat-transfer medium itself because of the ebullioscopic effect exerted by mixing of its components. Accordingly, there is no possibility that the mixture will boil and exert an adverse effect on production of the heat-transfer medium vapor and its transport through a pipeline.

4. In the prior art, no means for the storage of steam heat has been available except for an accumulator. Since the dissipation of heat due to the condensation of steam in an accumulator is unavoidable, it has been difficult to store heat with little loss. However, the present invention makes it possible to store heat in the form of a heat-transfer medium/absorption fluid mixture, so that efficient and easy-to-handle heat storage can be achieved.

5. After heat utilization, the heat-transfer medium/absorption fluid mixture can be efficiently separated by means of a compact device incorporating a semipermeable membranous material.

The present method for the transfer of heat energy is more specifically described with reference to the following examples and comparative example.

EXAMPLES 1 AND 2 AND COMPARATIVE EXAMPLE 1

Transfer of heat energy was carried out by using equipment as illustrated in the flow sheet of FIG. 1.

At a heat generation place 1 having a boiler, water was evaporated at atmospheric pressure to produce low-pressure steam having a temperature of 100° C. and a pressure of 1 kgG/cm$^2$. This low-pressure steam was transported to the heat demand side 3 through a heat-insulated transport pipeline 2 for heat-transfer medium vapor, having an internal diameter of 26 mm and a length of 8.5 m. In an absorption tank 4 having a capacity of 40 liters was placed about 35 kg of a 10 wt % aqueous solution of lithium bromide (Example 1) or a mixed aqueous solution of lithium bromide (10 wt %) and ethylene glycol (0.3 wt %) (Example 2). The transported low-pressure steam was introduced into this absorption fluid and liquefied thereby. During this process, the liquefaction of the low-pressure steam gave its latent heat of vaporization to the absorption fluid and, in addition, the dilution of the absorption fluid generated its heat of dilution. The absorption fluid heated to 110° C. or above and diluted in this manner was subsequently conducted through a high-pressure pump 5 into a heat exchange section 6 comprising a shell and tube type heat exchanger having a heat transfer surface area of 1.63 m$^2$, where the absorption fluid gave its heat to the consumption side and cooled to a temperature of 30° C. Thereafter, the absorption fluid was conducted into a separation section 7, where it was contacted, under a pressure of 80 kgG/cm$^2$, with a semipermeable membranous material comprising a polyether type porous material fixed to a supporting member. Thus, the mixture was separated into an absorption fluid having the same concentration as previously described and a liquid heat-transfer medium (pure water). The absorption fluid was recycled to the absorption tank through a pipeline 8, while the liquid heat-transfer medium was recycled to the heat generation place 1 through a pipeline 9.

In each of the above-described examples, the weight ratio ($W_2/W_1$) of the amount of low-pressure steam produced per unit time at the heat generation place ($W_1$) to the amount of absorption fluid separated in the separation section 7 and recycled per unit time to the absorption tank ($W_2$) was varied and the thermal efficiency [(the quantity of heat recovered in the heat exchange section 6)/(the quantity of heat generated at the heat generation place 1)×100] was determined as a function of $W_2/W_1$. The results thus obtained are plotted in FIG. 2.

For purposes of comparison, water was used as the absorption fluid and the same test was repeated to determine the thermal efficiency as a function of $W_2/W_1$. The results thus obtained are also plotted in FIG. 2.

EXAMPLES 3 AND 4

Tests were performed using the same equipment and conditions as described in Example 1, except that the value of $W_2/W_1$ was fixed at 20 and the proportions of lithium bromide (weight fraction x), water (weight fraction y) and dipropylene glycol (weight fraction z) constituting the absorption fluid were varied (provided that z=0.2x for Example 3 and z=0 for Example 4).

The weight fraction (x+z) of lithium bromide plus dipropylene glycol in the absorption fluid was varied and the degree of removal of lithium bromide and dipropylene glycol in the separation section 7 was determined as a function of (x+z). The results thus obtained are plotted in FIG. 3.

The aforesaid degree of removal is a parameter defined by the following equation:

$$\text{Degree of removal} = \left(1 - \frac{\text{Weight fraction } (x+z) \text{ in the liquid heat}-\text{transfer medium after separation}}{\text{Weight fraction } (x+z) \text{ in the liquid heat}-\text{transfer medium before separation}}\right) \times 100$$

Figure 2:
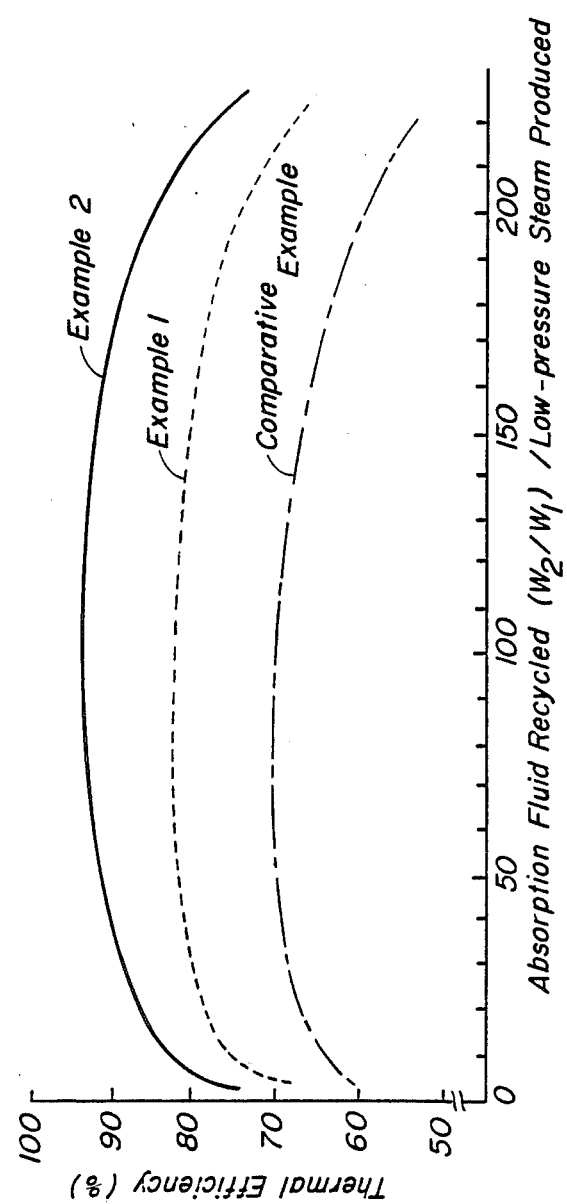
FIG. 2 is a graph showing the relationship between the ratio of the amount of absorption fluid recycled to the amount of low-pressure steam produced ($W_2/W_1$) and the thermal efficiency.

As is evident from FIG. 2, the transfer of heat energy by using an absorption fluid in accordance with the present invention can provide a higher thermal efficiency than the transfer of heat by means of the heat-transfer medium vapor alone. It can also be seen that the thermal efficiency is reduced unless the weight ratio ($W_2/W_1$) of the amount of low-pressure steam produced per unit time to the amount of absorption fluid recycled per unit time satisfies the conditions of $8 \leq W_2/W_1 \leq 200$.

Figure 3:
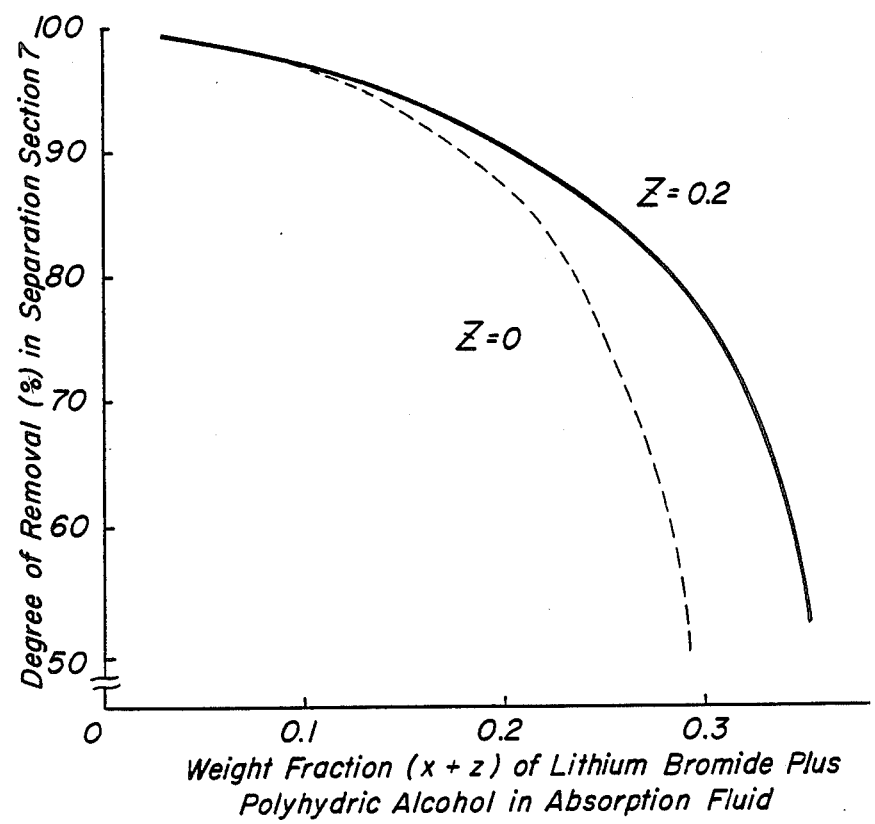
FIG. 3 is a graph illustrating the relationship between the weight fraction ($x+z$) of lithium bromide plus polyhydric alcohol in the absorption fluid and the degree of removal achieved at the separation section 7.

On the other hand, it is evident from FIG. 3 that, even if $W_2/W_1$ is equal to 20 and satisfies the above-described conditions, the degree of removal of the absorbent and the polyhydric alcohol from water in the separation section 7 is sharply reduced and the mass balance of the system is lost unless the concentration of the absorption fluid (the relationship between the weight fraction x of the absorbent and the weight fraction z of the polyhydric alcohol) satisfies the conditions of $0 \leq z < x \leq 0.3 - z$.

What is claimed:

1. A method for the transfer of heat energy which comprises the steps of
    (A) heating a liquid heat-transfer medium at a heat generation place to produce the vapor of said heat-transfer medium;
    (B) transporting the resulting heat-transfer medium vapor through a transport pipeline;
    (C) introducing the transported heat-transfer medium vapor into an absorption tank and allowing said heat-transfer medium vapor to be absorbed into an absorption fluid containing an absorbent, whereby the latent heat of said heat-transfer medium vapor and the heat of mixing generated by mixing of said heat transfer medium and said absorption fluid are utilized to elevate the temperature of the resulting liquid mixture of said heat-transfer medium and said absorption fluid to a temperature higher than that of said heat-transfer medium vapor;
    (D) withdrawing said mixture having the elevated temperature and utilizing its heat with the aid of a heat exchanger; and
    (E) separating said mixture having a lowered temperature as a result of the heat utilization into a liquid heat-transfer medium and an absorption fluid by means of a semipermeable membranous material having porosity, and recycling and reusing them as said heat-transfer medium and said absorption fluid, respectively.

2. A method as claimed in claim 1 wherein said heat-transfer medium comprises water and/or alcohol.

3. A method as claimed in claim 1 wherein said absorbent comprises one or more compounds selected from the group consisting of lithium chloride, lithium bromide, magnesium chloride and calcium chloride.

4. A method as claimed in claim 1 wherein said absorption fluid is a mixture of an absorbent, water and a polyhydric alcohol, and said polyhydric alcohol comprises one or more compounds selected from the group consisting of ethylene glycol, propylene glycol, glycerol, trimethylolpropane, pentaerythritol, sorbitol, diethylene glycol, triethylene glycol, tetraethylene glycol, dipropylene glycol and tripropylene glycol.

5. A method as claimed in claim 1 wherein said semipermeable membranous material having porosity is an organic semipermeable membranous material consisting essentially of cellulose acetate, methyl cellulose, polyether, polysulfone, polyalcohol or polystyrene, or an inorganic semipermeable membranous material consisting of a metallic colloid of zirconium, iron or copper supported on a porous ceramic member.

6. A method as claimed in claim 1 wherein the relationship between the amount of heat-transfer medium vapor ($W_1$ parts by weight) produced per unit time in said step (A) and the amount of absorption fluid ($W_2$ parts by weight) recycled per unit time in said step (E) is represented by $$8 \leq W_2/W_1 \leq 200.$$

7. A method as claimed in claim 1 wherein the absorption fluid is a mixture of an absorbent (weight fraction x), water (weight fraction y) and optionally a polyhydric alcohol (weight fraction z), and the weight fractions of these components satisfy the relationship represented by $$0 \leq z < x \leq 0.3 - z \text{ (provided that } x+y+z=1).$$

8. A method for the transfer of heat energy which comprises the steps of
    (A) heating a liquid heat-transfer medium at a heat generation place to produce the vapor of said heat-transfer medium;
    (B) transporting the resulting heat-transfer medium vapor through a transport pipeline;
    (C) introducing the transported heat-transfer medium vapor into an absorption tank and allowing said heat-transfer medium vapor to be absorbed into an absorption fluid containing an absorbent and optionally a polyhydric alcohol, whereby the latent heat of said heat-transfer medium vapor and the heat of mixing generated by mixing of said heat-transfer medium and said absorption fluid are utilized to elevate the temperature of the resulting liquid mixture of said heat-transfer medium and said absorption fluid to a temperature higher than that of said heat-transfer medium vapor;
    (D) withdrawing said mixture having the elevated temperature and utilizing its heat with the aid of a heat exchanger; and
    (E) separating said mixture having a lowered temperature as a result of the heat utilization into a liquid heat-transfer medium and an absorption fluid by means of a semipermeable membranous material having porosity, and recycling and reusing them as said heat-transfer medium and said absorption fluid, respectively, said method being characterized in that
    (a) the relationship between the amount of heat-transfer medium vapor ($W_1$ parts by weight) produced per unit time in said step (A) and the amount of absorption fluid ($W_2$ parts by weight) recycled per unit time in said step (E) is represented by $$8 \leq W_2/W_1 \leq 200$$

and (b) the weight fractions of the components of said absorption fluid satisfy the relationship represented by $0 \leq z < x \leq 0.3 - z$ (provided that $x+y+z=1$)

where x is the weight fraction of said absorbent, y is the weight fraction of water, and z is the weight fraction of said polyhydric alcohol.

* * * * *